United States Patent [19]

Sica, Jr. et al.

[11] 4,280,764

[45] Jul. 28, 1981

[54] PHASE-CONJUGATE INTERFEROMETER

[75] Inventors: Louis Sica, Jr., Alexandria, Va.; Hwaling H. Szu, Potomac, Md.

[73] Assignee: The United States of America as represented by the Secretary of the Navy, Washington, D.C.

[21] Appl. No.: 123,339

[22] Filed: Feb. 21, 1980

[51] Int. Cl.³ .......................... G01L 1/24; G01B 9/02; G01B 11/16

[52] U.S. Cl. .................................. 356/35.5; 356/345; 356/360

[58] Field of Search ................ 356/32, 35.5, 352, 345, 356/358–360, 371, 446; 73/655–657, 800

[56] References Cited

U.S. PATENT DOCUMENTS

| | | | |
|---|---|---|---|
| 2,688,899 | 9/1954 | Räntsch | 356/359 |
| 4,046,477 | 9/1977 | Kaule | 356/35.5 |
| 4,180,324 | 12/1979 | Primbsch | 356/35.5 |

OTHER PUBLICATIONS

Steel, W. H., "Interferometry", Cambridge at the Univer. Press, 1967, pp. 60–63.

*Primary Examiner*—William H. Punter
*Attorney, Agent, or Firm*—R. S. Sciascia; William T. Ellis; Alan P. Klein

[57] ABSTRACT

A speckle interferometer including a beam splitter, a mirror in the object beam arm, a phase-conjugate mirror in the reference beam arm, a converging lens and a photographic film. Laser light scattered retro-reflectively from a rough surface under investigation and passed through an imaging lens illuminates the interferometer. Fringes occur upon sandwiching a pair of exposures of the interference pattern made before and after deformation of the rough surface. The relative magnitude of the displacements from the original position at different points of the surface can be determined from the position of the fringes.

8 Claims, 4 Drawing Figures

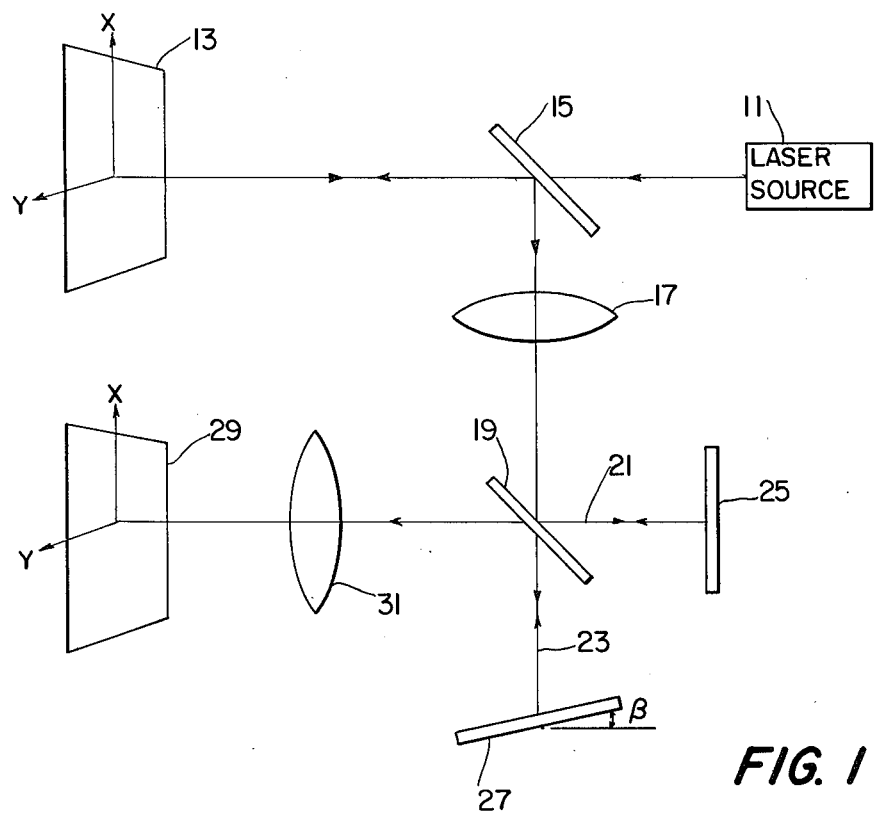
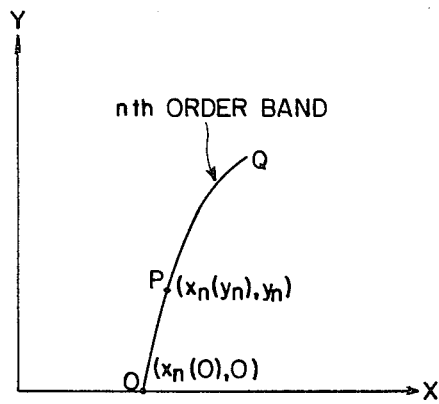
FIG. 3
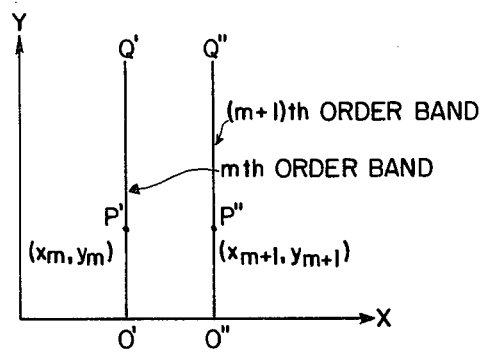
FIG. 4

PHASE-CONJUGATE INTERFEROMETER

BACKGROUND OF THE INVENTION

This invention relates to interferometry, and more particularly to an interferometry apparatus and method utilizing a phase-conjugate mirror.

Optical interferometers are known which make use of the interference phenomenon known as the "speckle effect"—the speckled pattern of laser light when reflected from a rough surface. One prior-art speckle interferometer takes the form of a Michelson-type instrument in which the mirror of one arm is replaced by a scattering surface. Provided that the coherence of the laser light is sufficiently high, speckles are formed by interference between light from the reference-beam arm and the light scattered retro-reflectively from the rough surface. Translating the scattering surface in the direction of the incident light causes each speckle to vary in brightness cyclically, from light to dark, independently from its neighbor, in a similar way that points on the equivalent Michelson mirror would appear to fluctuate in brightness as interference fringes sweep across it when the mirror is moved. The visual speckle interferometer can thus be used for detecting movement, but not for measuring the displacement that has taken place. Further, since a plane wave with uniform amplitude serves as the reference for the speckle wave, the plane wave cannot be matched to the random variation of amplitude over the speckle pattern. Thus, the visibility (or contrast) of the interference pattern cannot be made the same throughout the field.

SUMMARY OF THE INVENTION

It is therefore an object of the present invention to study the deformation of the surface of an object under stress.

It is a further object of the present invention to measure the relative magnitude of the displacements from the original position at different points on the surface of an object under stress.

It is yet another object of the present invention to provide an improved interferometry apparatus utilizing the speckle effect wherein the contrast of the interference pattern is the same everywhere in the field.

The objects of the present invention are achieved by an interferometer design using optical phase conjugation to yield fringes of good contrast and standard interferometric sensitivity. The speckle interferometer includes a beam splitter, a mirror in the object beam arm, a phase-conjugate mirror in the reference beam arm, a converging lens and a photographic film. Laser light scattered retro-reflectively from a rough surface under investigation and passed through a collimating lens illuminates the interferometer. Fringes occur upon sandwiching a pair of exposures of the interference pattern made before and after deformation of the rough surface. No additional spatial filtering step is necessary. The relative magnitude of the displacements from the original position at different points of the surface can be determined from the position of the fringes.

The foregoing as well as other objects, features and advantages of the present invention will become more apparent from the following detailed description when taken in conjunction with the appended drawings.

BRIEF DESCRIPTION OF THE DRAWINGS

FIG. 1 is a schematic diagram of the apparatus of the invention.

FIG. 3 is a schematic illustration of the $n^{th}$ order band.

FIG. 4 is a schematic illustration of the $m^{th}$ and $(m+1)$ th order bands.

DESCRIPTION OF THE PREFERRED EMBODIMENT

Figure 2:
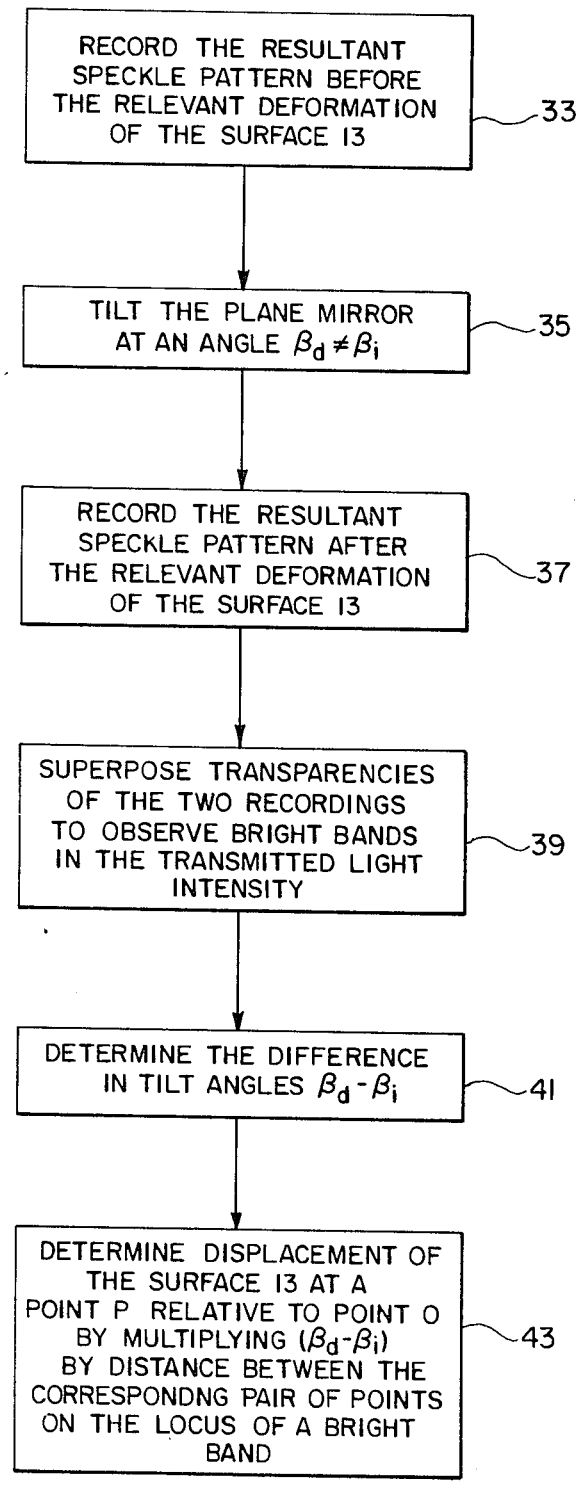
FIG. 2 is a flow chart of the steps in carrying out the method of the invention.

Referring to FIG. 1, the apparatus for studying the deformation of the surface of an object under stress, such as a loaded cantilever, includes a monochromatic laser source 11 which illuminates the surface 13 through a beam splitter 15. The surface 13 is assumed to be optically rough and therefore produces a speckle pattern when it is illuminated by the laser light. The light scattered by the points x, y of surface 13 is reflected by the beam splitter 15 into an imaging lens 17 to provide the input beam to the interferometer device. A beam splitter 19 divides the input beam into a reference beam 21 and an object beam 23. The reference beam 21 forms an image of surface 13 in the plane of a phase-conjugate mirror 25 and is reflected back to the beam splitter 19 by the phase-conjugate mirror 25 which reverses the phase of the beam. Suitable phase-conjugate mirrors are well-known in the art, and are discussed, for example, in the article "Phase Conjugate Optics" by J. AuYeung et. al., Optics News (Spring 1979) pp. 13–17. The object beam 23 forms an image of surface 13 in a plane normal to the beam and intersecting a plane mirror 27 tilted at an angle $\beta$ with respect to the plane and is reflected back to the beam splitter 19 by the mirror 27. The two beams 21 and 23 recombine at the beam splitter 19 and are photographed on film 29 through a converging lens 31 which forms an image of mirrors 25 and 27 at unit magnification onto film 29. At the photographic film 29, the speckle patterns produced by the two beams are allowed to interfere to produce a resultant image, the points x, y of which correspond to the points of surface 13. The recorded intensity in the film plane is given by:

$$I(x,y) = |u_o + u_r|^2 \qquad (1)$$

where $u_o$ and $u_r$ are the speckle patterns produced by the object beam 23 and the reference beam 21 respectively and are given by:

$$u_o = |A(x,y)| \exp\{i[\theta(x,y) + \alpha x]\} \qquad (2)$$

$$u_r = |A(x,y)| \exp\{i[-\theta(x,y)]\} \qquad (3)$$

In these expressions, $A(x,y)$ and $\theta(x,y)$ are functions of position in the film plane. $A(x,y)$ represents the square root of the intensity of the speckle patterns. The phase of $u_o$ is $\theta(x,y) + \alpha x$; the phase of $u_r$ is $-\theta(x,y)$. It is assumed that the optical path lengths in the interferometer device are matched except for the path difference introduced by the tilt of the mirror 27 which gives rise to a phase difference in the expression for $u_o$ of $(2\pi/\lambda)(2\beta)x \equiv \alpha x$ for small $\beta$. The minus sign before $\theta(x,y)$ in the expression for $u_r$ is due to the operation of the phase-conjugate mirror 25.

Substituting equations (2) and (3) into equation (1), the following expression is obtained for the recorded intensity:

$$I = 2|A(x,y)|^2 \{1 + \cos[2\theta(x,y) + \alpha x]\} \quad (4)$$

Note that in equation (4), the intensity of the speckle pattern $|A(x,y)|^2$ is multiplied by an expression which has a modulation index of unity but depends on the phase of the light. Thus, in applications where one wants to measure the phase variation across the beam of the electric field vector of a light wave of varying amplitude such as a speckle pattern, the phase conjugate of the wave may be used instead of a plane reference wave in the production of interference patterns for the measurement of the phase variation. Since the amplitudes of the light wave and its conjugate are the same, the visibility of the interference pattern is automatically one. This would not be the case if a plane wave with uniform amplitude were used as the reference for the speckle pattern. Because of the random variation of amplitude over the speckle pattern, the plane wave could not be matched to it. Thus, interference with the phase conjugate wave provides a relatively simple way to measure the phase of a speckle pattern.

Referring to the flow chart shown in FIG. 2, the method of studying the deformation of the surface 13 of the object under stress includes a first step 33 of recording the resultant speckle pattern before the relevant deformation of the surface 13. The recorded intensity at the film 29 is then given by:

$$I_i = 2|A|^2[1 + \cos(2\theta_i + \alpha_i x)] \quad (5)$$

where the functional dependence of A and $\theta$ on x and y has been suppressed. The expression $(2\theta_i + \alpha_i x)$ is the phase factor with the surface 13 in its initial state (i) and the plane mirror 27 tilted at an angle $\beta_i$.

Next, the second step 35 is performed hereby the plane mirror 27 is tilted at an angle $\beta_d$ different from $\beta_i$.

In the third step 37, the resultant speckle pattern is recorded after the relevant deformation of the surface 13. The recorded intensity at the film 29 is then given by:

$$I_d = 2|A|^2[1 + \cos(2\theta + \alpha_d x)] \quad (6)$$

where the expression $(2\theta + \alpha_d x)$ is the phase factor with the surface 13 in its deformed state (d) and the plane mirror 27 tilted at the angle $\beta_d$. The change in $\theta$ arises from the altered optical path length due to the deformation of the surface 13. The change in $\alpha x$ arises from the altered optical path length due to rotation of the plane mirror 27.

The fourth step 39 comprises superposing a set of transparencies of the two recordings in front of a source of light to observe the transmitted light intensity. The transmitted light intensity $I_T$ is proportional to the product of the separate intensities, i.e., $I_T = kI_i \cdot I_d$, where k is the proportionality constant. Substituting equations (5) and (6), $I_T$ is given by:

$$I_T = 16k|A|^4 \cos^2\left(\theta_i + \frac{\alpha_i x}{2}\right) \cos^2\left(\theta_d + \frac{\alpha_d x}{2}\right) \quad (7)$$

$$= 4k|A|^4(\cos^2 B + \cos^2 C + 2\cos B \cos C) \quad (8)$$

where $$B = \theta_i + \theta_d + \tfrac{1}{2}(\alpha_i + \alpha_d)x \quad (9)$$

$$C = \theta_i - \theta_d + \tfrac{1}{2}(\alpha_i - \alpha_d)x \quad (10)$$

Since the speckles are very small, a local spatial average can be performed on each term in equation (8). In an ensemble average sense, $\cos^2 B$ averages to $\tfrac{1}{2}$ assuming a uniform distribution of the phases $\theta_i$ and $\theta_d$ between $\pi$ and $-\pi$, while the cross-term $2\cos B \cos C$ averages to zero. Then equation (8) becomes $$\overline{I_T} = 4k\overline{|A|^4}\,(\tfrac{1}{2} + \overline{\cos^2 C}). \quad (11)$$

$$= 4k\overline{|A|^4}\,\{1 + \tfrac{1}{2}\cos[2(\theta_i - \theta_d) + (\alpha_i + \alpha_d)x]\} \quad (12)$$

The transmitted light intensity is a speckle pattern having a series of bands, alternately light and dark, appearing on it. The visibility (or contrast) of the bands is the same throughout the field, namely, the visibility $$V(x,y) = \frac{(I_T)_{MAX} - (I_T)_{MIN}}{(I_T)_{MAX} + (I_T)_{MIN}} = \tfrac{1}{2}$$

independent of position. Further, it will be appreciated that the factor of 2 in front of $(\theta_i - \theta_d)$ in the argument of the cosine doubles the sensitivity of the band pattern to a change in phase.

Each of the bright bands corresponds to a locus of points in the film plane for which the cosine term in equation (12) is a maximum. Referring to FIG. 3, the $n^{th}$ order bright band (viz., the one for which the argument of the cosine term equals $n\,2\pi$) is schematically illustrated as the curve OPQ in the film plane. Point P on the band satisfies the relation $$2\delta\theta(x_n(y_n),y_n) + \delta\alpha \cdot x_n(y_n) = n2\pi \quad (13)$$

where $\delta\theta = \theta - \theta_d$, $\delta\alpha = \alpha_i - \alpha_d$ and the subscript n refers to the $n^{th}$ order band. The dependence of $\delta\theta$ on x and y and the dependence of x on y along the band contour has been made explicit. $\delta\theta$ is a function whose amplitude varies in accordance with the normal displacements $\Delta$ at different parts of the surface 13 from the original position. $\delta\theta$ is zero at points in the film plane corresponding to points of the surface 13 where the displacement $\Delta$ is zero; a value for $\delta\theta$ of $2\pi$ radians corresponds to a normal displacement $\Delta$ at the surface 13 of one-half the wavelength of the laser light. Equation (13) can be rewritten in terms of $\Delta$ as follows:

$$4\Delta(x_n(y_n),y_n) + 2\delta\beta \cdot x_n(y_n) = n\lambda \quad (14)$$

Here, $\delta\alpha$ has been replaced by $\delta\alpha = 2\pi/\lambda(2\delta\beta)$ where $\delta\beta \equiv \beta_i - \beta_d$; and $\delta\theta$ has been replaced by $2\pi/\lambda(2\Delta)$, where the factor of 2 arises because the displacement is seen in reflection.

Point 0 on the band satisfies the relation $$4\Delta(x_n(0),0) + 2\delta\beta \cdot x_n(0) = n\lambda \quad (15)$$

Subtracting equation (15) from equation (14), the normal displacement of a point on the surface 13 corresponding to point P on the band relative to the normal displacement of a point on the surface 13 corresponding to point O on the band, is given by:

$$\Delta(x_n(y_n),y_n) - \Delta(x_n(0),0) = -(\tfrac{1}{2})\delta\beta[x_n(y_n) - x_n(0)] \quad (16)$$

In the fifth step 41, the difference in tilt angles, $\delta\beta$ is determined. From a region of the film plane where the bands are straight, corresponding to no displacement of the surface 13, i.e., $\Delta(x,y)=0$, one can find the value of $\delta\beta$ from the distance between two bands. Referring to FIG. 4, the $m^{th}$ and $(m+1)$th order bands for such a region of the film plane are illustrated as lines O'P'Q' and O"P"Q". From equation (14), point P on the $m^{th}$ order band satisfies the relation:

$$2\delta\beta \cdot x_m = m\lambda \quad (17)$$

where $x_m$ is the x coordinate of the $m^{th}$ order band. Point P" on the $(m+1)$th order band satisfies the relation $$2\delta\beta \cdot x_{m+1} = (m+1)\lambda \quad (18)$$

where $x_{m+1}$ is the x coordinate of the $(m+1)$th order band. Subtracting equation (18) from equation (17), the difference in tilt angles is given by:

$$\delta\beta = \frac{\lambda}{2(x_{m+1} - x_m)} \quad (19)$$

If the bands are not straight anywhere in the field, $\delta\beta$ can in principle be found from a pair of preliminary recordings taken before the surface 13 is deformed.

The sixth step 43 is performed to determine the normal displacement of a point on the surface 13 corresponding to point P on the band, relative to the normal displacement of a point on the surface 13 corresponding to point O on the band from equation (16) by multiplying $\delta\beta/2$ by the distance between the two points O and P along the x direction.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An interferometer device comprising:
a beam splitter for dividing an input beam of coherent monochromatic light into an object beam and a reference beam after the input beam has been reflected from a surface under investigation;
a phase-conjugate mirror spaced from the beam splitter for reflecting the reference beam back to the beam splitter with a reversal in phase;
a mirror spaced from the beam splitter and tiltable at an angle with respect to a plane normal to the object beam for reflecting the object beam back to the beam splitter to recombine with the reflected reference beam; and
means for imaging the interference pattern produced by the recombined beams.

2. The interferometer device recited in claim 1 wherein the imaging means includes:
a converging lens spaced from the beam splitter.

3. An interferometer device, for use with a coherent, monochromatic light beam for illuminating a surface to be examined by the interferometric device, which comprises:
means for directing along a predetermined path the beam which is reflected from the surface to be examined;
a beam-splitter for splitting the beam which is directed along the predetermined path into an object beam and a reference beam;
a phase-conjugate mirror spaced from the beam splitter for reflecting the reference beam back to the beam splitter with a reversal in phase;
a mirror spaced from the beam splitter and tiltable at an angle with respect to a plane normal to the object beam for reflecting the object beam back to the beam splitter to recombine with the reflected reference beam; and
means for imaging the interference pattern produced by the recombined beams.

4. The interferometer device recited in claim 3 wherein the imaging means includes:
a converging lens spaced from the beam splitter.

5. A method for measuring the deformation of the surface of an object under stress comprising the steps of:
(a) locating the surface prior to deformation in the path of an input beam of coherent monochromatic light;
(b) reflecting the input beam from the surface;
(c) directing the reflected input beam into a beam splitter, thereby providing outgoing object and reference beams;
(d) reflecting the reference beam from a phase-conjugate mirror back to the beam splitter with a reversal in phase;
(e) reflecting the object beam from a mirror, tilted at an angle with respect to a plane normal to the object beam, back to the beam splitter to recombine with the reflected reference beam;
(f) imaging the interference pattern produced by the recombined beams to produce a first recording;
(g) tilting the object beam-reflecting mirror at a different angle;
(h) repeating steps (b)-(e) after deformation of the surface of the object;
(i) imaging the interference pattern produced by the recombined beams to produce a second recording;
(j) superposing a set of transparencies of the two recordings in front of a source of light to observe bright bands in the transmitted light intensity;
(k) determining the difference in tilt angles of the mirror beam-reflecting mirrors; and
(l) calculating the displacement of the surface of the object at a first point of the surface relative to the displacement at a second point of the surface, the two points corresponding to a pair of points on the locus of the bright band, from the difference in tilt angles and the distance in a predetermined direction between the pair of points on the locus of the bright band.

6. The method recited in claim 5 including the step of: imaging the reflected input beam after step (b).

7. The method recited in claim 5 wherein step (k) includes the steps of:
determining the magnitude of the uniform spacing between two straight bright bands in the transmitted light intensity; and
dividing the wavelength of the input light beam by twice the magnitude of the spacing between the two straight bands.

8. The method recited in claim 5 wherein step (l) includes the steps of:
determining the magnitude of the distance in a predetermined direction between the pair of points on the locus of the bright band; and
multiplying one-half the tilt angle difference by the magnitude of the distance between the pair of points.

* * * * *